United States Patent [19]

Matuura et al.

[11] 4,088,812
[45] May 9, 1978

[54] PROCESS FOR PREPARING POLYOLEFINS

[75] Inventors: Kazuo Matuura, Kawasaki; Masaomi Matsuzaki, Yokohama; Humiaki Oshimi, Kawasaki; Nobuyuki Kuroda, Yokohama; Mituji Miyoshi, Kanagawa, all of Japan

[73] Assignee: Nippon Oil Company, Limited, Tokyo, Japan

[21] Appl. No.: 752,003

[22] Filed: Dec. 20, 1976

Related U.S. Application Data

[63] Continuation of Ser. No. 534,088, Dec. 18, 1974, abandoned.

[30] Foreign Application Priority Data

Dec. 27, 1973 Japan .................................. 48/44364
May 21, 1974 Japan .................................. 49/56119

[51] Int. Cl.$^2$ .......................... C08F 4/02; C08F 10/02
[52] U.S. Cl. ............................... 526/121; 252/429 C; 252/430; 526/97; 526/124; 526/129; 526/132; 526/156; 526/352
[58] Field of Search ................. 526/97, 121, 124, 129, 526/132, 138, 156

[56] References Cited

U.S. PATENT DOCUMENTS 2,345,655  4/1944  Brandenburg ...................... 423/554
3,705,886  12/1972  Kashiwa et al. .................... 526/124

FOREIGN PATENT DOCUMENTS 1,140,649  1/1967  United Kingdom.
1,264,416  2/1972  United Kingdom.

Primary Examiner—Edward J. Smith
Attorney, Agent, or Firm—Cooper, Dunham, Clark, Griffin & Moran

[57] ABSTRACT

This invention discloses an improved catalyst for the polymerization or copolymerization of olefins, and a process for preparing polyolefins which comprises polymerizing or copolymerizing olefins using the said catalyst. According to the invention there is provided a process for preparing polyolefins by polymerizing or copolymerizing olefins using as a catalyst at least one compound selected from the group consisting of a titanium compound and a vanadium compound supported on a solid carrier, and an organometallic compound, said solid carrier comprising a product obtained by treatment with $SO_3$ of at least one member selected from the group consisting of an oxide of Group II–IV metals of the Periodic Table and a double oxide of the said oxide and other oxide, which other oxide may be another oxide of Group II–IV metals of the Periodic Table or may be an oxide of other Group metals of the same Table.

10 Claims, No Drawings

PROCESS FOR PREPARING POLYOLEFINS

This is a continuation, of application Ser. No. 534,088 filed Dec. 18, 1974, now abandoned.

BACKGROUND OF THE INVENTION

1. Field of the Invention

This invention relates to a process for preparing polyolefins using a novel polymerization catalyst. More particularly, it is concerned with a process for preparing polyolefins which comprises making at least one compound selected from the group consisting of a titanium compound and a vanadium compound which are a component of Ziegler catalyst, supported on a carrier, said carrier being composed of a product obtained by treatment with $SO_3$ of at least one member selected from the group consisting of an oxide and a double oxide of Group II–IV metals of the Periodic Table, thereafter activating said compound supported on said carrier with an organometallic compound, and polymerizing or copolymerizing olefins using the resulting catalyst.

2. Description of the Prior Art

In the technical field of this sort there has heretofore been known a catalyst comprising a transition metal compound such as titanium and vanadium compounds supported on various kinds of inorganic solids as a carrier. As typical of these inorganic carriers are mentioned, for example, alumina, titanium dioxide, zirconia, silica, thoria, and magnesia (see Japanese patent publication No. 25353/1969).

In general, however, those catalysts obtained by supporting a transition metal compound such as a titanium compound and/or a vanadium compound which are a component of Ziegler catalyst on the above-mentioned carriers, and subsequently activating said transition metal compound supported on said carrier with an organo-metallic compound, have a low activity and thus they are disadvantageous in this point. Among the above-mentioned carriers, magnesia has been known to afford a relatively high activity, but alumina and silica have afforded nothing but catalysts of an extremely low activity.

On the other hand in the process for preparing polyolefins it is desirable that polymerization activity be as high as possible. If the polymerization activity is high, it is possible to obtain polyolefins in high hield at a low partial pressure of monomer and that in a short period of time, with the cost of catalyst being of course reduced; in addition, the step of removing catalyst, which step is usually required, becomes simpler and, in some cases, even if the step of removing catalyst is omitted, the resulting polymer can sufficiently be put to practical use, with an extremely low amount of ash content remained in the polymer. As a result, there is provided a process for preparing polyolefins, which process, as a whole, is extremely simplified. From this point of view, many of the catalyst systems using the above-mentioned inorganic carriers as they are have a low activity, and it has been considered necessary that they should be improved.

SUMMARY OF THE INVENTION

We have devoted ourselves to the study of the above-mentioned catalyst with carrier. As a result there are now provided a process for preparing a novel olefin polymerizing catalyst and a process for polymerizing olefins using the said catalyst.

More particularly, this invention relates to a process for polymerizing or copolymerizing olefins using a catalyst, which catalyst is obtained by supporting a titanium compound and/or a vanadium compound on a carrier consisting of a product which is obtained by treating with $SO_3$ one or mixture of two or more of an oxide and a double oxide from Group II–IV metals of the Periodic Table, and thereafter activating the titanium compound and/or vanadium compound supported on said carrier with an organometallic compound. By using the process of the invention, that is, by treating the above-mentioned oxide or double oxide with $SO_3$, activity per the solid catalyst or per the transition metal component is remarkably increased as compared with the case in which no such $SO_3$ treatment is applied, so that the foregoing merits based on the improvement of polymerization activity are satisfied; and what is above all characteristic is that the activity becomes higher to the extent that the step of removing catalyst is no longer required. As will be apparent from the above, it is entirely beyond anticipation and cannot but be considered to be a surprising fact that a remarkable improvement in polymerization activity has been attained by means of such a novel process, that is, the $SO_3$ treatment, which has not heretofore been known at all.

DESCRIPTION OF THE INVENTION

The details of the characteristic features of the invention will become further clarified from the following description.

In this invention, there is used as a carrier a product obtained by treating with $SO_3$ one member from or a mixture of two or more of an oxide and a double oxide of Group II–IV metals of the Periodic Table. As an example of the metal oxides there are mentioned $Al_2O_3$, MgO, CaO, ZnO, BaO, $B_2O_3$, $SiO_2$ and $SnO_2$.

As alumina ($Al_2O_3$) there can be used various kinds of aluminas such as, for example, one obtained through thermal decomposition of aluminum alkoxide and one obtained by calcining a well-known crystalline or non-crystalline hydrated alumina. Calcining conditions can be widely selected within the well-known range, but calcining is desirable to be effected at a temperature ranging from about 200° to 1,000° C. Further, the physical properties of alumina which are important in usual technical use, such as particle size, surface area and pore volume can, of course, be changed, depending on the process for preparing alumina; an appropriate selection thereof according to various purposes can easily be effected by those skilled in the art. Of course, the alumina employed in the invention may contain, according to the purpose, inorganic compounds of other metals such as Na, Ca, Mg, Si, and Fe.

The double oxide referred to herein means an oxide containing Group II–IV metals of the Periodic Table and at least one other metal (which may be a metal other than Group II–IV metals of the same Table). Typical of such double oxide are mentioned $MgO \cdot Al_2O_3$, $SiO_2 \cdot Al_2O_3$, $MgO \cdot SiO_2$, $MgO \cdot CaO \cdot Al_2O_3$, and $Al_2O_3 \cdot CaO$. It is to be understood that the above-mentioned formulae are not molecular formulae, but they represent only composition and that the structure and the ratio of components of the double oxides used in the invention are not particularly limited thereby.

As natural double oxides having the above-mentioned composition there are mentioned montmorillonite, sillimanite, cosalite, and calcined hydrotalcite. Heat treated ones of these natural double oxides are also employable in the invention. In the invention, these oxides and double oxides may be employed either alone or in combination of two or more.

The method of treating the above-mentioned oxides or double oxides with $SO_3$ can widely be selected, but it is effected by contacting $SO_3$ in the form of a liquid, solid or gaseous phase with the foregoing oxides or double oxides. As as example of preferred treating methods there is mentioned a method of contacting a gaseous $SO_3$ with the above-mentioned oxides or double oxides. As the treating condition it is desirable that the contact with $SO_3$ be effected usually at a temperature ranging from room temperature to 1,000° C, preferably from 50° to 500° C., for 1 min. to 24 hrs. The amount of $SO_3$ to be reacted with the above-mentioned oxides or double oxides can widely be selected according to the kind and the difference in the mode of reaction of the oxides or double oxides used. However, with too small amounts of $SO_3$, there will be less effect on the improvement of activity, while, on the contrary, with too large amounts of $SO_3$, most of $SO_3$ will be waste; therefore, such amounts of $SO_3$ used are not desirable. The content of sulfur atoms in the product treated with $SO_3$ is suitably in the range from 0.1 to 20% by weight, more preferably from 0.5 to 10% by weight. Usually, the object of the invention can be attained by using $SO_3$ in an amount from 0.005 to 50 mol., preferably 0.01 to 10 mol., per mol. of the oxide or double oxide. Although the details of the reaction of the oxides or double oxides with $SO_3$ in the invention are not clear, it is presumed that a novel carrier is formed as a result of the $SO_3$ treatment, judging from the fact that a substantial amount of sulfur atoms are detected in the oxides or double oxides after treatment with $SO_3$. It has been absolutely beyond anticipation and cannot but be considered to be a surprising fact that an extremely high activity is achievable by using as a carrier the above-mentioned oxides or double oxides after treatment with $SO_3$.

As the method for making a titanium compound and/or a vanadium compound supported on the carrier prepared as above, well-known methods can be used. For example, it can be done by contacting the carrier prepared as above with a transition metal compound under heating in the presence or absence of an inert solvent; and, preferably, it is conveniently conducted by heating the two to a temperature of from 50° to 300° C., preferably from 100° to 150° C., in the absence of a solvent. With respect to the reaction time, it is not particularly limited, but usually it is more than 5 minutes; it may be prolonged, although it is not necessary. For example, the reaction time may be 5 minutes to 10 hours. As the other method for supporting a titanium compound and/or a vanadium compound with the above-mentioned carrier, the method of contacting both the components by some mechanical means such as ball milling can be used without any trouble. It goes without saying that these operations should be conducted in an inert gas atmosphere under oxygen- and moisture- free conditions. The transition metal compounds used in the invention may be in excess amounts, usually 0.001 to 50 times by weight against the above-mentioned carrier being employable. Preferably, excess transition metal halides are removed through washing with solvent after the mixing, heat treatment. As the means for removing the unreacted transition metal compounds after completion of the reaction, there is no particular limitation, but usually conducted is a several time washing with a solvent which is inert against the Ziegler catalyst, followed by evaporation of the resulting washing under reduced pressure, to give a powdered solid.

The polymerization reaction of olefins using the catalyst of the invention is conducted in the same manner as in the olefin polymerization reaction by means of a conventional Ziegler catalyst. Substantially oxygen- and moisture- free conditions are maintained throughout the reaction. The polymerization conditions for olefins include a temperature in the range from 20° to 300° C., preferably 50° to 180° C., and a pressure in the range from normal to 70 kg/cm$^2$, preferably from 2 to 60 kg/cm$^2$. Control of molecular weight can be done to a certain degree by changing polymerization conditions such as polymerization temperatures and the molar ratio of catalyst but can more effectively be done by additon of hydrogen into the polymerization system. With the catalyst of the invention, of course, two- or more-stage polymerization reactions having different polymerization conditions such as hydrogen concentration and polymerization temperatures can also be done without any trouble.

The process of the present invention can be applied to the polymerization of all the olefins polymerizable with Ziegler catalyst. For example, it is suitably employed for homopolymerization of olefins such as ethylene, propylene, and 1-butene, and for copolymerization of ethylene and propylene, ethylene and 1-butene, and propylene and 1-butene. The transition metal compounds used in the invention are compounds of titanium and vanadium. Illustrative are tetravalent titanium compounds such as titanium tetrachloride, titanium tetrabromide, ethoxytitanium trichloride, diethoxytitanium dichloride, dibuthoxytitanium dichloride, phenoxytitanium trichloride, and tetra-n-buthoxytitanium; trivalent titanium compounds such as titanium trichloride, and titanium trichloride-aluminum trichloride complex tetravalent vanadium compounds such as vanadium tetrachloride; pentavalent vanadium compounds such as vanadium oxytrichloride, and orthoalkyl vanadate; and trivalent vanadium compounds such as vanadium trichloride.

As the organometallic compound used in the invention may be mentioned organometallic compounds from metals of Group I-IV of the Periodic Table which is generally known as a component of Ziegler catalyst, and especially preferable are organoaluminum, organomagnesium and organozinc compounds. Illustrative are organoaluminum compounds of the general formulae $R_3Al$, $R_2RlX$, $RAlX_2$, $R_2AlOR$, $RAl(OR)_2$, $RAl(OR)X$ and $R_3Al_2X_3$ wherein R is alkyl or aryl and X is halogen and organozinc compounds of the general formula $R_2Zn$ where R is alkyl and may be the same or different including triethylaluminum, triisobutylaluminum, trioctylaluminum, tridecylaluminum, diethylaluminum chloride, ethylaluminum sesquichloride, ethoxydiethylaluminum, and diethylzinc; and as organomagnesium compounds, Grignard's reagents such as ethylmagnesium bromide, butylmagnesium chloride, and phenylmagnesium chloride, and organomagnesium compounds such as diethylmagnesium, dibutylmagnesium, and diphenylmagnesium and ether complex thereof; and mixtures thereof. There is no particular limitation to the amount of these organometallic compounds used in the invention, but usually the compounds can be used at a molar ratio from 0.1 to 1,000 against the transition metal halide.

DESCRIPTION OF THE PREFERRED EMBODIMENTS

The examples which follow are submitted to illustrate and not to limit the invention.

EXAMPLE 1

(a) Preparation of catalyst

A commercially available alumina ("X-2" manufactured by Sumitomo Kagaku, surface area 130–180 m$^2$/g.) was pulverized and then subjected to sieving through a 200 mesh sieve and calcined at 650° C. for 2 hrs. 5 g. of the alumina was placed in a glass tube 3.5 cm in diameter equipped with a perforated plate and maintained at 200° C. while a gaseous SO$_3$ was introduced from the lower portion of the glass tube. In the treatment mentioned above, the gaseous SO$_3$ was obtained from 20 ml. of a liquid SO$_3$ which was gasified at normal temperature, and the treatment of contacting the said alumina with the gasified SO$_3$ at 200° C. was continued for 1 hr. After completion of the treatment, a purified nitrogen gas was introduced at 200° C. for 1 hr. The product thus treated was transferred to a flask equipped with a stirrer, in which was then added 80 ml. of titanium tetrachloride. The mixture was heat treated at 150° C. for 2 hrs. Thereafter, the reaction product was washed with hexane; the washing operation was repeated until no titanium tetrachloride was recognized in the washing. The solid portion was subjected to drying and then analysis to find that 30.1 mg. of titanium per g. of the solid was supported.

(b) Polymerization

A 2 liter stainless steel autoclave equipped with an induction stirrer was purged with nitrogen and charged with 1000 ml. of hexane. To it were added 5 mmol. of triethylaluminum and 608 mg. of the above-mentioned solid and the temperature was raised to 90° C. with stirring. The system, which was at a pressure of 2 kg/cm.$^2$ from vapor pressure of the hexane and nitrogen, was pressurized with hydrogen to a total pressure of 6 kg/cm.$^2$ and then with ethylene to a total pressure of 10 kg/cm.$^2$ followed by initiation of the polymerization. Ethylene was continuously introduced to maintain the total pressure at 10 kg/cm.$^2$ while conducting the polymerization for 60 min. After completion of the polymerization, the polymer slurry was transferred to a beaker, from which the hexane was removed under reduced pressure to obtain 129 g. of white polyethylene with a melt index of 0.021. The catalyst activity was 1,760 g. polyethylene/g. Ti·hr.·C$_2$H$_4$ pressure, 53 g. polyethylene/g. solid·hr.·C$_2$H$_4$ pressure. The activities per titanium and per solid were remarkably improved as compared with those in Comparative Example 1 wherein no SO$_3$ treatment was applied.

COMPARATIVE EXAMPLE 1

Preparation of catalyst was conducted in the same way as in Example 1 except that the alumina was not treated with SO$_3$, to give a solid with 16.5 mg. of titanium per g. of the solid supported. A polymerization was conducted for 1 hr. in the same way as in Example 1 except that 451 mg. of the above-mentioned solid was employed, to yield only 21.6 g. of white polyethylene with a melt index of 0.053. The catalyst activity was 728 g. polyethylene/g. Ti·hr.·C$_2$H$_4$ pressure, 12 g. polyethylene/g. solid·hr.·C$_2$H$_4$ pressure. The activities per titanium and per solid were apparently inferior to those in Example 1 wherein the SO$_3$ treatment was applied.

EXAMPLE 2

A commercially available alumina monohydrate ("Ketjen B") was calcined at 700° C. for 16 hrs. under a nitrogen atmosphere to give an activated alumina. 5 g. of the activated alumina was contacted at 200° C. for 1 hr. with a gasified SO$_3$, which was being obtained from 20 ml. of a liquid SO$_3$ through gasification of the latter at normal temperature in the same way as in Example 1. After completion of the treatment, titanium tetrachloride was supported in the same manner as in Example 1, to give a catalyst with 31.2 mg. of titanium per g. of the solid supported. A polymerization was conducted for 1 hr. in the same procedure as in Example 1 except that 385 mg. of the said catalyst was employed, to yield 250 g. of white polyethylene with a melt index of 0.011. The catalyst activity was 5,190 g. polyethylene/g. Ti·hr.·C$_2$H$_4$ pressure, 162 g. polyethylene/g. solid·hr.·C$_2$H$_4$ pressure. The activities per titanium and per solid were remarkably improved as compared with those in Comparative Example 2 wherein no SO$_3$ treatment was applied.

COMPARATIVE EXAMPLE 2

Preparation of catalyst was conducted in the same way as in Example 2 except that the alumina was not treated with SO$_3$, to give a solid with 16.4 mg. of titanium per g. of the solid supported. A polymerization was conducted for 1 hr. in the same way as in Example 1 except that 392 mg. of the said solid was used, to yield only 50.1 g. of white polyethylene with a melt index of 0.040. The catalyst activity was 1,950 g. polyethylene/g. Ti·hr.·C$_2$H$_4$ pressure, 32 g. polyethylene/g. solid·hr.·C$_2$H$_4$ pressure. The activities per titanium and per solid were apparently inferior to those in Example 2 wherein the SO$_3$ treatment was applied.

EXAMPLE 3

The SO$_3$ treatment was applied to alumina in the same way as in Example 1 except that the alumina was obtained from AF hydrated alumina manufactured by Shokubai Kasei (boehmite, surface area: about 380 m$^2$/g.) through calcining of the latter at 650° C. for 2 hrs. Thereafter, a titanium tetrachloride was supported on the alumina after treatment with SO$_3$. As a result, there was obtained a catalyst with 22.0 mg. of titanium per g. of the solid supported. A polymerization was conducted for 1 hr. in the same way as in Example 1 except that 417 mg. of the said catalyst was used, to yield 140 g. of white polyethylene with a melt index of 0.44 under high load (21.6 kg.). The catalyst activity was 3,810 g. polyethylene/g. Ti·hr.·C$_2$H$_4$ pressure, 84 g. polyethylene/g. solid·hr.·C$_2$H$_4$ pressure. The activities per titanium and per solid were remarkably improved as compared with those in Comparative Example 3 wherein no SO$_3$ treatment was applied.

COMPARATIVE EXAMPLE 3

Preparation of catalyst was conducted in the same way as in Example 3 except that the alumina was not treated with SO$_3$, to give a solid with 14.3 mg. of titanium per g. of the solid supported. A polymerization was conducted for 1 hr. in the same manner as in Example 1 except that 653 mg. of the said solid was used, to yield only 37 g. of white polyethylene with a melt index of 0.012. The catalyst activity was 980 g. polyethylene/g. Ti·hr.·C$_2$H$_4$ pressure, 14 g. polyethylene/g. solid·hr.·C$_2$H$_4$ pressure. The activities per titanium and per solid were apparently inferior to those in Example 3 wherein the SO$_3$ treatment was applied.

EXAMPLE 4

In the same way as in Example 2 except that 318 mg. of the catalyst prepared in Example 2 was employed hexane, triethylaluminum, the solid catalyst, and hydrogen were introduced and thereafter an ethylene-propylene mixture containing 2 mol.% propylene was supplied at 90° C. to maintain the pressure in the autoclave at 10 kg/cm.$^2$ while conducting the polymerization for 1 hr. As a result, there was obtained 165 g. of ethylene-propylene copolymer with a melt index of 0.018. The catalyst activity was 4,160 g. polyethylene/g. Ti·hr.·C$_2$H$_4$ pressure, 130 g. polyethylene/g. solid·hr.·C$_2$H$_4$ pressure.

EXAMPLE 5

Preparation of catalyst was conducted in the same way as in Example 1 except that the alumina in Example 2 was used and that it was treated with SO$_3$ at 350° C. for 1 hr., to give a catalyst with 22.1 mg. of titanium per g. of the solid supported. A polymerization was conducted in the same way as in Example 1 except that 503 mg. of the said catalyst was used to yield 187 g. of white polyethylene with a melt index of 0.010.

EXAMPLE 6

Preparation of catalyst was conducted in the same way as in Example 3 except that 2 ml. of SO$_3$ was gasified at normal temperature and contacted with the alumina at 150° C. for 1 hr., to give a catalyst with 20.6 mg. of titanium per g. of the solid supported. A polymerization was conducted in the same manner as in Example 1 except that 471 mg. of the said catalyst was used, to yield 117 g. of white polyethylene with a melt index of 0.41 under high load.

EXAMPLE 7

Preparation of catalyst was conducted in the same way as in Example 3 except that 94 g. of dichlorodiethoxy titanium was used in lieu of 80 mg. of titanium tetrachloride, to give a catalyst with 25.7 mg. of titanium per g. of the solid supported. A polymerization was conducted in the same manner as in Example 3 except that 532 mg. of the said solid was used and that triisobutylaluminum was used in lieu of triethylaluminum, to yield 172 g. of white polyethylene with a melt index of 0.39 under high load.

EXAMPLE 8

A polymerization was conducted for 1 hr. in the same way as in Example 3 except that 196 mg. of the catalyst prepared in Example 3 was used and that tridecylaluminum was used in lieu of triethylaluminum, to yield 195 g. of white polyethylene with a melt index of 0.72 under high load. The catalyst activity was 11,320 g. polyethylene/g. Ti·hr.·C$_2$H$_4$ pressure, 249 g. polyethylene/g. solid·hr.·C$_2$H$_4$ pressure.

EXAMPLE 9

(a) Preparation of catalyst 10 g. of magnesium oxide ("Kyowa Mag. 150" manufactured by Kyowa Kagaku) was heat treated at 500° C. for 5 hrs. It was then placed in a glass tube 3.5 cm in diameter equipped with a perforated plate and maintained at 200° C. while a gaseous SO$_3$ was introduced from the lower portion of the glass tube. In the treatment mentioned above, the gaseous SO$_3$ was obtained from 0.25 ml. of a liquid SO$_3$ which was gasified at normal temperature, and the treatment of contacting the said magnesium oxide with the gasified SO$_3$ at 200° C. was continued for 30 min. After completion of the treatment, a purified nitrogen gas was introduced at 200° C. for 30 min. The product thus treated, which contained 1.6% by weight of sulfur, was transferred to a flask equipped with a stirrer in which was then added 80 ml. of titanium tetrachloride. The mixture was heat treated at 150° C. for 2 hrs. Thereafter, the reaction product was washed with hexane; the washing operation was repeated until no titanium tetrachloride was recognized in the washing. The solid portion was subjected to drying and then analysis to find that 11 mg. of titanium per g. of the solid was supported.

(b) Polymerization

A 2 liter stainless steel autoclave equipped with an induction stirrer was purged with nitrogen and charged with 1000 ml. of hexane. To it were added 5 mmol. of triethylaluminum and 860 mg. of the above-mentioned solid and the temperature was raised to 90° C. with stirring. The system, which was at a pressure of 2 kg/cm.$^2$ from vapor pressure of the hexane and nitrogen, was pressurized with hydrogen to a total pressure of 6 kg/cm.$^2$ and then with ethylene to a total pressure of 10 kg/cm.$^2$ followed by initiation of the polymerization. Ethylene was continuously introduced to maintain the total pressure at 10 kg/cm.$^2$ while conducting the polymerization for 60 min. After completion of the polymerization, the polymer slurry was transferred to a beaker, from which the hexane was removed under reduced pressure to obtain 313 g. of white polyethylene with a melt index of 0.85. The catalyst activity was 91 g. polyethylene/g. solid·hr.·C$_2$H$_4$ pressure, 8,280 g. polyethylene/g. Ti·hr.·C$_2$H$_4$ pressure. The catalyst activity per titanium was extremely high as compared with that in the following Comparative Example 4 wherein no SO$_3$ treatment was applied. High catalyst activity per titanium is extremely desirable, since titanium atoms remained in the polymer would have a bad influence on the polymer, such as deterioration and discoloration.

COMPARATIVE EXAMPLE 4

Preparation of catalyst was made in the same manner as in Example 9 except that the magnesium oxide was not treated with SO$_3$, to give a catalyst with 60 mg. of titanium per g. of the solid supported. A polymerization was conducted in the same procedure as in Example 9 except that 161 mg. of the above-mentioned catalyst was employed, to yield 101 g. of white polyethylene with a melt index of 1.37. The catalyst activity was 157 g. polyethylene/g. solid·hr.·C$_2$H$_4$ pressure, 2,620 g. polyethylene/g. Ti·hr.·C$_2$H$_4$ pressure. The catalyst activity per titanium was extremely low as compared with that in Example 9 wherein the SO$_3$ treatment was applied.

EXAMPLE 10

The SO$_3$ treatment was made in the same manner as in Example 9 except that 0.34 ml., in lieu of 0.25 ml., of SO$_3$ was used followed by making titanium tetrachloride supported, to give a catalyst with 10 mg. of titanium per g. of the solid supported. A polymerization was made for 1 hr. in the same procedure as in Example 9 except that 795 mg. of the above-mentioned catalyst was employed, to yield 292 g. of white polyethylene with a melt index of 0.79. The catalyst activity was 92 g. polyethylene/g. solid·hr.·$C_2H_4$ pressure, 9,150 g. polyethylene/g. Ti·hr.·$C_2H_4$ pressure. The activity per titanium was remarkably improved as compared with that in Comparative Example 4.

EXAMPLE 11

The $SO_3$ treatment was made in the same manner as in Example 9 except that, in lieu of the magnesium oxide, 10 g. of silicaalumina (commercially available "Ketjen AS" calcined at 700° C. for 6 hrs.) was used and that 9.5 ml., in lieu of 0.25 ml. of $SO_3$ was used, to give a product containing 9.7% by weight of sulfur. Titanium tetrachloride was then supported on the product thus treated in the same way as in Example 9 to give a catalyst with 25 mg. of titanium per g. of the solid supported. A polymerization was made in the same procedure as in Example 9 except that 342 mg. of the above-mentioned catalyst was employed, to yield 130 g. of white polyethylene with a melt index of 0.001. The catalyst activity was 95 g. polyethylene/g. solid·hr.·$C_2H_4$ pressure, 3,800 g. polyethylene/g. Ti·hr.·$C_2H_4$ pressure. The catalyst activities per titanium and per solid were remarkably improved as compared with those in the following Comparative Example 5 wherein no $SO_3$ treatment was applied.

COMPARATIVE EXAMPLE 5

Preparation of catalyst was made in the same manner as in Example 11 except that the $SO_3$ treatment was not applied, to give a catalyst with 22 mg. of titanium per g. of the solid supported. A polymerization was made for 1 hr. in the same procedure as in Example 9 except that 447 mg. of the above-mentioned catalyst was employed, to yield 36 g. of white polyethylene with a melt index of 0.042. The catalyst activity was 20 g. polyethylene/g. solid·hr.·$C_2H_4$ pressure, 910 g. polyethylene/g. Ti·hr.·$C_2H_4$ pressure. The activities per solid and per titanium were extremely low as compared with those in Example 11 wherein the $SO_3$ treatment was applied.

EXAMPLE 12

The $SO_3$ treatment was made in the same manner as in Example 11 except that 5 ml., in lieu of 9.5 ml., of $SO_3$ was used, to give a product containing 5.1% by weight of sulfur. Preparation of catalyst was made in the same way as in Example 11 except that the above treated product was employed, to give a catalyst with 23 mg. of titanium per g. of the solid supported. A polymerization was made for 1 hr. in the same procedure as in Example 9 except that 416 mg. of the above-mentioned catalyst was used, to yield 184 g. of white polyethylene. The catalyst activity was 110 g. polyethylene/g. solid·hr.·$C_2H_4$ pressure, 4,780 g. polyethylene/g. Ti·hr.·$C_2H_4$ pressure. The activities per solid and per titanium were remarkably high as compared with those in Comparative Example 5 wherein no $SO_3$ treatment was applied.

EXAMPLE 13

A commercially available magnesia alumina ["Kyowardo CMA 1.25" manufactured by Kyowa Kagaku (Mg/Al atomic ratio = 1.25)] was vacuum heated at 150° C. for 2 hrs. and then contacted at 200° C. with 19 ml. of $SO_3$ gasified in the same way as in Example 9, to give a carrier containing 23.6% by weight of sulfur. Preparation of catalyst was made in the same manner as in Example 9 except that the above treated carrier was employed, to give a catalyst with 6 mg. of titanium per g. of the solid supported. A polymerization was made for 1 hr. in the same procedure as in Example 9 except that 918 mg. of the above-mentioned catalyst was used, to yield 33 mg. of white polyethylene with a melt index of 0.04. The catalyst activity was 1,410 g. polyethylene/g. Ti·hr.·$C_2H_4$ pressure. The activity per titanium was improved as compared with that in the following Comparative Example 6 wherein no $SO_3$ treatment was applied.

COMPARATIVE EXAMPLE 6

Preparation of catalyst was made in the same manner as in Example 13 except that the $SO_3$ treatment was not applied. A polymerization was made for 1 hr. in the same procedure as in Example 13 except that 132 mg. of the above-mentioned catalyst was employed, to yield 19 g. of white polyethylene with a melt index of 0.06. The catalyst activity was 1,030 g. polyethylene/g. Ti·hr.·$C_2H_4$ pressure. The activity per titanium was apparently low as compared with that in Example 13 wherein the $SO_3$ treatment was applied.

EXAMPLE 14

Preparation of catalyst was made using the $SO_3$ treated carrier prepared in Example 9 in the same manner as in Example 9 except that trichloromonobutoxytitanium was used in lieu of titanium tetrachloride, to give a catalyst with 11 mg. of titanium per g. of the solid supported. A polymerization was made for 1 hr. in the same procedure as in Example 9 except that 366 mg. of the above-mentioned catalyst was used and that, in lieu of triethylaluminum, triisobutylaluminum was employed, to yield 126 g. of white polyethylene with a melt index of 0.72. The catalyst activity was 7,830 g. polyethylene/g. Ti·hr.·$C_2H_4$ pressure. The activity per titanium was remarkably improved as compared with that in the following Comparative Example 7 wherein no $SO_3$ treatment was applied.

COMPARATIVE EXAMPLE 7

A catalyst was prepared in the same manner as in Example 14 except that the $SO_3$ treatment was not applied. A polymerization was made in the same procedure as in Example 14 except that the above-mentioned catalyst was used, to yield 61 g. of white polyethylene with a melt index of 1.30. The catalyst activity was 2,710 g. polyethylene/g. Ti·hr.·$C_2H_4$ pressure. The activity per titanium was extremely low as compared with that in Example 14 wherein the $SO_3$ treatment was applied.

EXAMPLE 15

A commercially available silica (for chromatography) was calcined at 400° C. for 5 hrs. and then contacted at 200° C. for 1 hr. with 19 ml. of $SO_3$ gasified at normal temperature in the same manner as in Example 9, to give a carrier containing 3.6% by weight of sulfur. A catalyst was prepared in the same way as in Example 9 except that the above treated carrier was employed. A polymerization was made for 2 hr. in the same procedure as in Example 9 except that 1,013 mg. of the above-mentioned catalyst was used and that, in lieu of triethylaluminum, triisobutylaluminum was employed, to yield 20 g. of white polyethylene. The catalyst activity was 5g./g. solid·hr.·$C_2H_4$ pressure. The activity per solid was apparently improved as compared with that in the following Comparative Example 8 wherein no $SO_3$ treatment was applied.

COMPARATIVE EXAMPLE 8

A catalyst was prepared in the same manner as in Example 15 except that the $SO_3$ treatment was not applied. A polymerization was made in the same procedure as in Example 15 except that the above-mentioned catalyst was employed. As a result, however, there was obtained only a trace amount of polyethylene. The activity was apparent low as compared with that in Example 15 wherein the $SO_3$ treatment was applied.

EXAMPLE 16

In the same manner as in Example 9 except that 813 mg. of the catalyst prepared in Example 9 was employed, hexane, triethylaluminum, the solid catalyst, and hydrogen were introduced and thereafter an ethylene-propylene mixture containing 2 mol.% propylene was supplied at 90° C. to maintain the pressure in the autoclave at 10 kg./cm$^2$ while conducting the polymerization for 1 hr. As a result, there was obtained 270 g. of ethylene-propylene copolymer containing 5.1 methyl groups per 1,000 carbon atoms and having a melt index of 1.07. The catalyst activity was extremely high; 7,550 g. polyethylene/g. Ti Ti·hr.·$C_2H_4$ pressure.

EXAMPLE 17

Preparation of catalyst was made in the same manner as in Example 9 except that, in lieu of the magnesium oxide, CaO. MgO.Al$_2$O$_3$ ["Kyowardo 1200" manufactured by Kyowa Kagaku (composition: CaO about 35% by weight, MgO about 20%, and Al$_2$O$_3$ about 45%) heat treated at 150° C.] was used, to give a catalyst with 9 mg. of titanium per g. of the solid supported. A polymerization was made in the same procedure as in Example 9 except that 627 mg. of the above-mentioned catalyst was employed, to yield 33 g. of white polyethylene with a melt index of 1.02. The activity was 1,460 g. polyethylene/g. Ti·hr.·$C_2H_4$ pressure. The activity per titanium was remarkably improved as compared with that in Example 9.

COMPARATIVE EXAMPLE 9

Preparation of catalyst was made in the same manner as in Example 9 except that the carrier in Example 17 was used and that no $SO_3$ treatment was applied, to give a catalyst with 61 mg. of titanium per g. of the solid supported. A polymerization was made in the same procedure as in Example 9 except that 143 mg. of the above-mentioned catalyst was employed, to yield 22 g. of white polyethylene with a melt index of 1.10. The activity was 630 g. polyethylene/g. Ti·hr.·$C_2H_4$ pressure; the activity per titanium was far inferior to that in Example 17 wherein the $SO_3$ treatment was applied.

We claim:

1. Process for preparation of polyolefins by polymerizing or copolymerizing olefins in the presence of a catalyst comprising at least one compound selected from the group consisting of a titanium compound and a vanadium compound supported on a solid carrier and an organometallic compound, from metals of Group I–IV of the Periodic Table,
    said solid carrier consisting of a product containing from 0.1% to 20% by weight of sulfur and obtained by treatment with $SO_3$ of at least one member selected from the group consisting of
    (1) a first oxide of group II–IV metals of the Periodic Table, and
    (2) a second oxide which is a double oxide consisting of two of the said first oxides or a double oxide consisting of said first oxide and an oxide of a metal from a group other than Group II–IV metals, the treatment with sulfur trioxide being conducted for a period of from 1 minute to 24 hours at a temperature from room temperature to 1000° C.

2. Process according to claim 1 wherein said oxide is selected from the group consisting of Al$_2$O$_3$, MgO, CaO, ZnO, BaO, B$_2$O$_3$, SiO$_2$, and SnO$_2$.

3. Process according to claim 1 wherein said double oxide is selected from the group consisting of magnesia-alumina, silica-alumina, magnesia-silica, magnesia-calcium oxide-alumina, and alumina-calcium oxide.

4. Process according to claim 1 wherein said oxide or said double oxide is treated with 0.005 to 50 mol. of $SO_3$ per mol. of said oxide or said double oxide.

5. A process according to claim 4 wherein 0.01 to 10 mol of $SO_3$ per mole of said oxide or said double oxide is employed.

6. Process according to claim 1 wherein homopolymerization of an α-olefin selected from the group consisting of ethylene, propylene and 1-butene or copolymerization of ethylene and propylene, ethylene and 1-butene or propylene and 1-butene is performed.

7. Process according to claim 1 wherein the polymerization or copolymerization of olefins is effected at a temperature ranging from 20° to 300° C. under a pressure ranging from ordinary pressure to 70 kg/cm$^2$.

8. A process according to claim 7 wherein the temperature is from 50° to 180° C.

9. A process according to claim 7 wherein the pressure is from 2 to 60 kg/cm$^2$.

10. Process according to claim 1 wherein the polymerization of olefins is effected in the presence of hydrogen.

* * * * *